(12) United States Patent
Struhsaker et al.

(10) Patent No.: US 7,065,098 B2
(45) Date of Patent: Jun. 20, 2006

(54) REDUNDANT TELECOMMUNICATION SYSTEM USING MEMORY EQUALIZATION APPARATUS AND METHOD OF OPERATION

(75) Inventors: Paul F. Struhsaker, Plano, TX (US); Sanjay D. Kulkarni, Plano, TX (US); James S. Denton, Plano, TX (US)

(73) Assignee: Raze Technologies, Inc., Plano, TX (US)

( * ) Notice: Subject to any disclaimer, the term of this patent is extended or adjusted under 35 U.S.C. 154(b) by 987 days.

(21) Appl. No.: 09/839,259

(22) Filed: Apr. 20, 2001

(65) Prior Publication Data

US 2002/0097670 A1 Jul. 25, 2002

Related U.S. Application Data

(60) Provisional application No. 60/263,097, filed on Jan. 19, 2001.

(51) Int. Cl.
*H04L 12/56* (2006.01)
(52) U.S. Cl. .................. 370/429; 370/417; 370/395.71; 711/167
(58) Field of Classification Search ................ 370/347, 370/278, 233, 332, 352, 395.1, 230, 412, 370/417, 428, 429, 395.71; 375/233, 332; 709/205, 238; 710/113; 455/11.1; 711/167
See application file for complete search history.

(56) References Cited

U.S. PATENT DOCUMENTS

| 5,058,051 | A | * | 10/1991 | Brooks ......................... 711/167 |
| 5,638,371 | A | | 6/1997 | Raychaudhuri et al. ..... 370/347 |
| 5,684,791 | A | | 11/1997 | Raychaudhuri et al. ..... 370/278 |
| 5,694,424 | A | | 12/1997 | Ariyavisitakul .............. 375/233 |
| 5,809,086 | A | | 9/1998 | Ariyavisitakul .............. 375/332 |
| 5,991,292 | A | | 11/1999 | Focsaneanu et al. ........ 370/352 |
| 6,188,873 | B1 | | 2/2001 | Wickman et al. ........... 455/11.1 |
| 6,243,778 | B1 | * | 6/2001 | Fung et al. .................. 710/113 |
| 6,535,512 | B1 | * | 3/2003 | Daniel et al. ............ 370/395.1 |

FOREIGN PATENT DOCUMENTS

| EP | 0 441 087 | 8/1991 |
| GB | 2 030 334 | 4/1980 |

OTHER PUBLICATIONS

Anderson, "Firewire System Architecture", second edition, 1394a, PC System Architecture Series, 1999, pp. 13-16.*

(Continued)

*Primary Examiner*—John Pezzlo (57) ABSTRACT

Data which must be memory equalized across a redundant, high availability system utilizing processor-based components is structured in memory segments which form data packets for a data link between active and standby components. Direct memory access is employed to copy memory segments within the active component into a queue for the data link, which transfers memory segments without utilizing the processor within the active component while automatically verifying data integrity and acknowledging successful data transfers. The direct memory access copying of memory segments to the queue may be triggered for changed memory segments by either the processor or specialized hardware within the active component, or may be run in a continuous loop sequencing through a predefined range of memory segments. The standby component may thus be kept abreast of changes to data within memory segments, such as changes to call states or resource allocation records relating to call processing.

36 Claims, 8 Drawing Sheets

OTHER PUBLICATIONS

Amza, C., et al.; "Data Replication Strategies for Fault Tolerance and Availability on Commodity Clusters"; XP000988678; International Conference on Dependable Systems and Networks, Los Alamitos, CA IEEE Comp.; Jun. 25, 2000; pp. 459-467.

Nagar, S., et al.; "Issues in Designing and Implementing a Scalable Virtual Interface Architecture"; Parallel Processing Conference Proceedings; IEEE, 2000; XP010516421; pp. 405-412.

* cited by examiner

REDUNDANT TELECOMMUNICATION SYSTEM USING MEMORY EQUALIZATION APPARATUS AND METHOD OF OPERATION

The present invention claims priority to U.S. Provisional Application Ser. No. 60/263,097 filed Jan. 19, 2001.

CROSS-REFERENCE TO RELATED APPLICATIONS

The present invention is related to those disclosed in the following United States Provisional and Non-Provisional Patent Applications:

1) Ser. No. 09/713,684, filed on Nov. 15, 2000, entitled "SUBSCRIBER INTEGRATED ACCESS DEVICE FOR USE IN WIRELESS AND WIRELINE ACCESS SYSTEMS";
2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";
3) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
4) Ser. No. 09/839,729, filed Apr. 20, 2001, entitled "APPARATUS AND METHOD FOR OPERATING A SUBSCRIBER INTERFACE IN A FIXED WIRELESS SYSTEM";
5) Ser. No. 09/839,719, filed Apr. 20, 2001, entitled "APPARATUS AND METHOD FOR CREATING SIGNAL AND PROFILES AT A RECEIVING STATION";
6) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES";
7) Ser. No. 09/839,509, filed Apr. 20, 2001, entitled "BACKPLANE ARCHITECTURE FOR USE N WIRELESS AND WIRELINE ACCESS SYSTEMS";
8) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";
9) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
10) Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION";
11) Ser. No. 09/839,075, filed Apr. 20, 2001, entitled "TDD FDD AIR INTERFACE";
12) Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM";
13) Ser. No. 09/839,458, filed Apr. 20, 2001, entitled "WIRELESS ACCESS SYSTEM USING MULTIPLE MODULATION";
14) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
15) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM";
16) Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";
17) Ser. No. 09/839,734, filed Apr. 20, 2001, entitled "METHOD FOR ESTABLISHING A PRIORITY CALL IN A FIXED WIRELESS ACCESS COMMUNICATION SYSTEM";
18) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";
19) Ser. No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";
20) Ser. No. 60/262,825, filed on Jan. 19, 2001, entitled "APPARATUS ANT) ASSOCIATED METHOD FOR OPERATING UPON DATA SIGNALS RECEIVED AT A RECEIVING STATION OF A FIXED WIRELESS ACCESS COMMUNICATION SYSTEM";
21) Ser. No. 60/262,698, filed on Jan. 19, 2001, entitled "APPARATUS AND METHOD FOR OPERATING A SUBSCRIBER INTERFACE IN A FIXED WIRELESS SYSTEM";
22) Ser. No. 60/262,827, filed on Jan. 19, 2001, entitled "APPARATUS AND METHOD FOR CREATING SIGNAL AND PROFILES AT A RECEIVING STATION";
23) Ser. No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";
24) Ser. No. 60/262,951, filed on Jan. 19, 2001, entitled "BACKPLANE ARCHITECTURE FOR USE IN WIRELESS AND WIRELINE ACCESS SYSTEMS";
25) Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";
26) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
27) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
28) Ser. No. 60/262,955, filed Jan. 19, 2001, entitled "TDD FDD AIR INTERFACE";
29) Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";
30) Ser. No. 60/273,689, filed Mar. 5, 2001, entitled "WIRELESS ACCESS SYSTEM USING MULTIPLE MODULATION";
31) Ser. No. 60/273,757, filed Mar. 5, 2001, entitled "WIRELESS ACCESS SYSTEM AND ASSOCIATED METHOD USING MULTIPLE MODULATION FOR-

MATS IN TDD FRAMES ACCORDING TO SUBSCRIBER SERVICE TYPE";

32) Ser. No. 60/270,378, filed Feb. 21, 2001, entitled "APPARATUS FOR ESTABLISHING A PRIORITY CALL IN A FIXED WIRELESS ACCESS COMMUNICATION SYSTEM";

33) Ser. No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM"; and 34) Ser. No. 60/270,430, filed Feb. 21, 2001, entitled "METHOD FOR ESTABLISHING A PRIORITY CALL IN A FIXED WIRELESS ACCESS COMMUNICATION SYSTEM".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to communication network access systems and, more specifically, to a memory equalization technique for use in redundant telecommunication equipment in, for example, a fixed wireless access system.

BACKGROUND OF THE INVENTION

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace. To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percent of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and 2) Transparent operation with network protocols and protocol time constraints for the following protocols:
  a) ATM;
  b) Class 5 switch interfaces (domestic GR-303 and international V5.2);
  c) TCP/IP with quality-of-service QoS for voice over IP (VoIP) (i.e., RTP) and other H.323 media services;
  d) Distribution of synchronization of network time out to the subscribers;

3) Increased use of voice, video and/or media compression and concentration of active traffic over the air interface to conserve bandwidth;

4) Switching and routing within the access system to distribute signals from the central office to multiple remote cell sites containing multiple cell sectors and one or more frequencies of operation per sector; and 5) Remote support and debugging of the subscriber equipment, including remote software upgrade and provisioning.

Unlike physical optical or wire systems that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at wire line bit error rates.

Wireless access systems should also sustain high availability for users. A necessary part of achieving high availability telecommunications systems, such as wireless access systems, is design of critical components in a redundant fashion where an "active" side handles primary functionality while a "standby" side remains idle but quickly available in the event of failure within the primary side. Being redundant, both resources are necessarily capable of performing the same system functions.

For systems which are processor controlled, the active side typically maintains status and control information for all resources which the active side controls within a private memory. Upon failure of the active side, the standby side must begin operation within a minimal amount of time. During switch-over from the active side to the standby side for primary functionality, a primary concern is that no change is apparent (transparency) to the end user. To accomplish such transparency to the end user, the standby side is generally abreast with any and all changes on the primary side (equalization) as closely as possible in real time. As a result of equalization, the standby side is able to quickly begin processing with a duplicate copy of the status and control information which the active side was utilizing at the time of failure within the active side.

Two typical techniques are employed in order to achieve equalization of active and standby memory contents: software-based and hardware-based. With software-based techniques, the processor on the active side copies certain critical information, formats the copied information into a message form and transmits the message to the standby side processor, all under software control. The control processor on the standby side receives the message and interprets the content to determine whether the message contains equalization information to be moved appropriately into the private memory of the standby side control processor, again all under software control. However, the amount of time required to format and transfer data utilizing, the need for a messaging protocol and verification of data integrity, and the need to interpret and properly store data on the standby side all increase the overhead associated with this method. Additionally, these requirements all add to the latency (delay) associated with keeping the two sides equalized.

Latency in memory equalization has two principal effects: First, the speed at which the active side processes calls is reduced since the active side is unable to process calls faster than the rate at which associated information is transferred to the standby side and properly stored. If the active side processes calls faster than the transfer rate to the standby side, the standby side falls behind in maintaining an accurate copy of the active side's status and control information (coherency), which defeats the purpose of equalization. Second, as latency in memory equalization increases, so does the probability of data loss for data essential to resuming operations in the standby side in the event of failure in the active side. Furthermore, attempts to speed transfers between the active and standby sides to reduce latency generally require dedicating more processing time to memory equalization-related tasks, which inherently reduces the amount of processing time available for non-redundancy tasks (e.g., call processing).

With hardware-based techniques for active and standby memory equalization, the active and standby components are typically very tightly coupled—in some instances to the extent that both processors are synchronized for every instruction. Since both sides operate on exactly the same instruction at exactly the same time, both side are kept equalized. However, this technique requires considerable expense to implement and, although guarding against hardware failures, suffers the side effect of vulnerability to software failures. For example, a logic flaw on the active side will be exactly duplicated on the standby side, corrupting potentially mission-critical data even as both sides are kept equalized.

There is, therefore, a need in the art for a memory equalization technique which reduces equalization latency over software-based equalization methods while avoiding the expense and software error vulnerability of hardware-based equalization methods.

SUMMARY OF THE INVENTION

To address the above-discussed deficiencies of the prior art, it is a primary object of the present invention to provide, for use in a redundant, high availability system utilizing processor-based components, an improved memory equalization technique.

Data which must be memory equalized across a redundant, high availability system utilizing processor-based components is structured in memory segments which form data packets for a data link between active and standby components. Direct memory access is employed to copy memory segments within the active component into a queue for the data link, which transfers memory segments without utilizing the processor within the active component while automatically verifying data integrity and acknowledging successful data transfers. The direct memory access copying of memory segments to the queue may be triggered for changed memory segments by either the processor or specialized hardware within the active component, or may be run in a continuous loop sequencing through a predefined range of memory segments. The standby component may thus be kept abreast of changes to data within memory segments, such as changes to call states or resource allocation records relating to call processing.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless access network.

Figure 1:
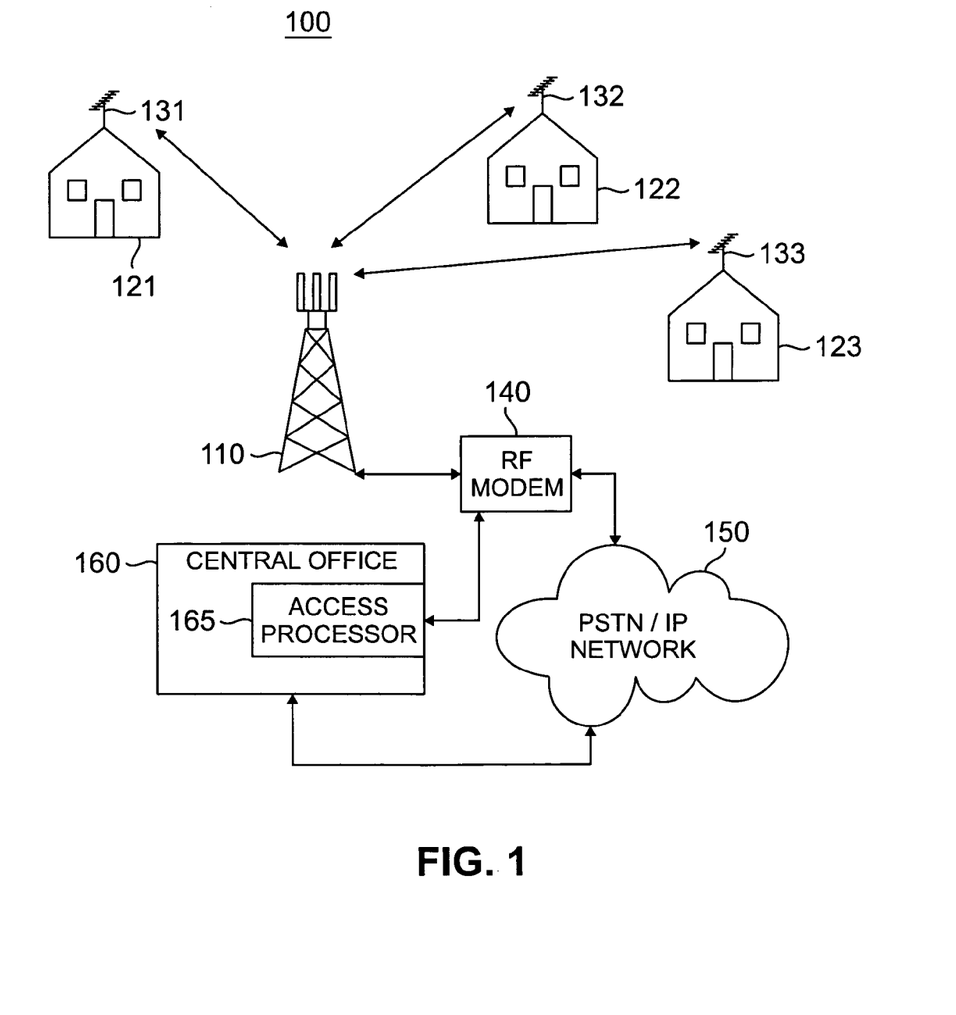
FIG. 1 illustrates exemplary fixed wireless access network 100 according to one embodiment of the present invention.

FIG. 1 illustrates an exemplary fixed wireless access network 100 according to one embodiment of the present invention. Fixed wireless network 100 comprises a plurality of transceiver base stations, including exemplary transceiver base station 110, that transmit forward channel (i.e., downstream) broadband signals to a plurality of subscriber premises, including exemplary subscriber premises 121, 122 and 123, and receive reverse channel (i.e., upstream) broadband signals from the plurality of subscriber premises. Subscriber premises 121–123 transmit and receive via fixed, externally-mounted antennas 131–133, respectively. Subscriber premises 121–123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel signals from external network 150 and transmit the reverse channel signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem 140, which, among other things, up-converts baseband data traffic received from external network 150 to RF signals transmitted in the forward channel to subscriber premises 121–123. RF modem 140 also down-converts RF signals received in the reverse channel from subscriber premises 121–123 to baseband data traffic that is transmitted to external network 150. In an exemplary embodiment of the present invention in which external network 150 is the public switched telephone network (PSTN), RF modem 140 transmits baseband data traffic to, and receives baseband data traffic from, access processor 165, which is disposed in central office facility 160 of the PSTN.

It should be noted that network 100 was chosen as a fixed wireless network only for the purposes of simplicity and clarity in explaining a subscriber integrated access device according to the principles of the present invention. The choice of a fixed wireless network should not be construed in any manner that limits the scope of the present invention in any way. As will be explained below in greater detail, in alternate embodiments of the present invention, a subscriber integrated access device according to the principles of the present invention may be implemented in other types of broadband access systems, including wireline systems (i.e, digital subscriber line (DSL), cable modem, fiber optic, and the like) in which a wireline connected to the subscriber integrated access device carries forward and reverse channel signals.

Figure 2:
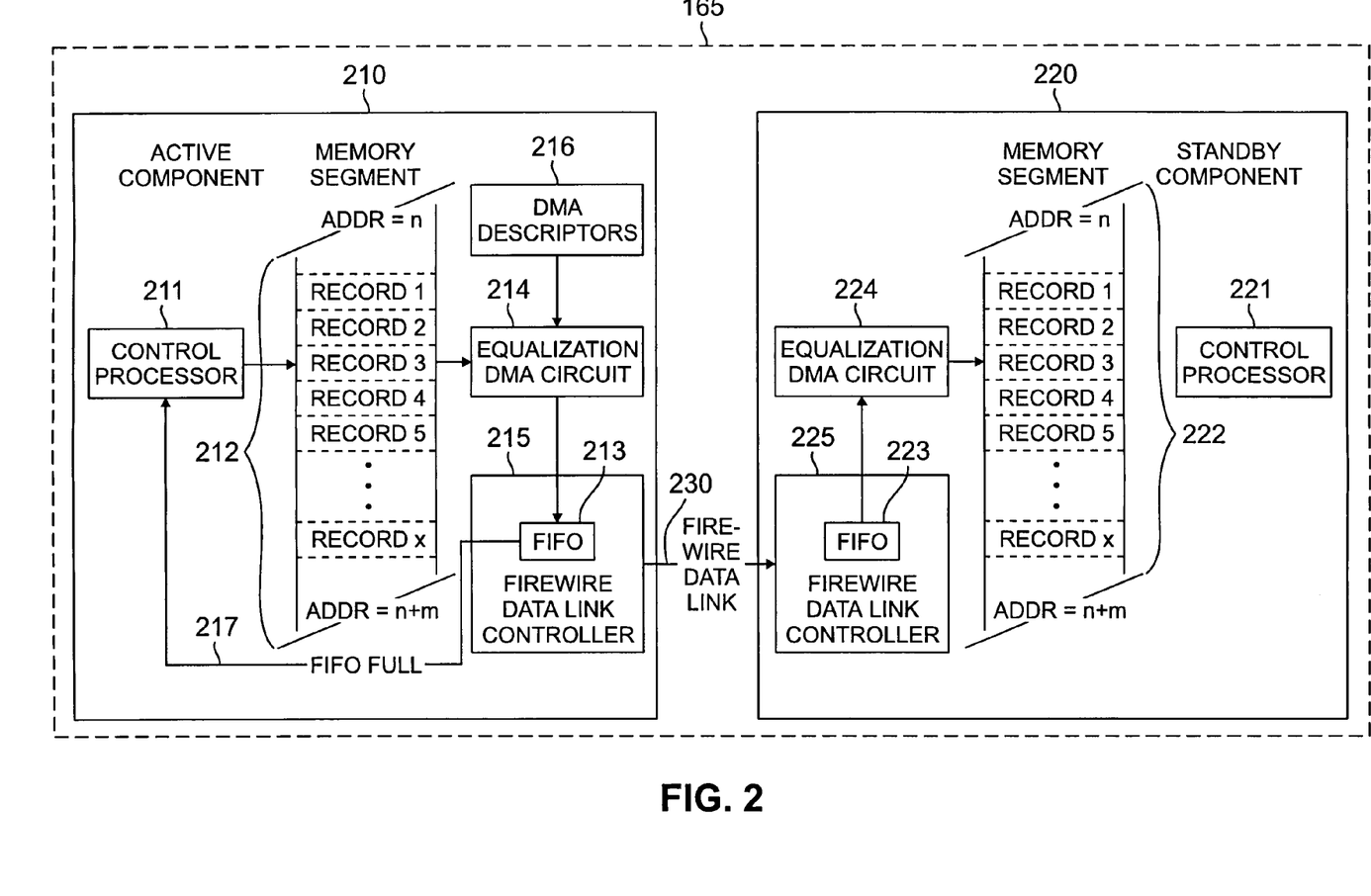
FIG. 2 depicts in greater detail memory equalized redundant access processing units in the exemplary fixed wireless access network according to one embodiment of the present invention.

FIG. 2 illustrates in greater detail memory equalized redundant access processing units in the exemplary fixed wireless access network according to one embodiment of the present invention. To provide redundancy for a telecommunications system such as fixed wireless access network 100, access processor 165 depicted in FIG. 1 is, in the present invention, actually redundant processing units including an active component 210 and a standby component 220. Active and standby components 210 and 220 each include a control processor 211 and 221, respectively, and a memory including memory segments 212 and 222, respectively. All call state and resource allocation information required for the standby component 220 to take over call processing in the event of a failure in active component 210 is maintained in predefined memory segments 212 and 222. Addresses n through n+m of these predefined memory segments are, by convention, known to both active and standby components 210 and 220.

The data which needs to be equalized across the system consists of:

1. logical states associated with each call attempt (call states), which embody where each call is with respect to the common flow of logic for calls (unless otherwise indicated, the term "call," while employed in the art and herein to refer to voice communications, is merely representative of a communications transfer to which the present invention may be applied and the features of the invention are equally applicable to any communications transfer, including but not limited to voice communications, data communications, multi-media or "streaming media" communications, individual data packets, broadband circuits, uni- or multi-directional streaming sessions, and the like); and 2. system resource records which reflect the current status of shared system resources(i.e., define the current ownership and the current state of the corresponding resource) and which are allocated on an on-going, call-by-call or packet-by-packet basis. It should be noted that the memory equalization technique of the present invention is not constrained to call states and resource records, but instead may be applied to any memory segment requiring equalization across redundancy pairs and which may be structure for use with the mechanisms described herein.

To optimize memory equalization for redundancy purposes, the call states (or similar information regarding a communications transfer, such as an individual data packet state, etc.) are arranged as discrete data structures—one for each call attempt—each occupying contiguous blocks of memory locations within memory segment 212 (and memory segment 222), forming one or more of Record 1, Record 2, . . . , Record x within memory segment 212. With such a configuration, the data as stored within memory segment 212 (Record 1 through Record x) is optimized for formatting into a packet to be transmitted from the active component 210 to the standby component 220. Resource allocation records for resources which are controlled by the active component 210 are allocated in a similar manner, also forming one or more of Record 1 through Record x within memory segment 212. The precise internal format of Record 1 through Record x for either call state records or resource allocation records is a matter of design choice, with a tradeoff associated with the optimal size of data packets which may be most efficiently transmitted to the standby component 220.

Storage of call state and resource allocation records Record 1 through Record x within memory segment 212 is coordinated at the system level. The embodiment of FIG. 2 is implemented utilizing an open-standard, Firewire-based (IEEE 1394) data link 230 or other similar data link. Consequently, the memory allocation may be mapped system-wide to predefined segments of Firewire Global Memory (which is described in widely-available open-standards documentation) contained within memory segments 212 and 222. Using the Firewire-based data link 230, memory is allocated from the Firewire Global Memory and mapped to memory segments 212 and 222. The range of allocated memory addresses (n to n+m in the example shown) are known, by convention, to each system component 210 and 220 and mapped according to the system physical location (i.e., slot number) for the corresponding component 210 or 220. The global memory architecture of Firewire allows memory for memory segments 212 and 222 to be pre-allocated across a system without regard to how the system is configured at any given point in time.

It should be noted that resources contained within the Firewire-based data link 230 are available for other system purposes, and that the embodiment illustrated in FIG. 2 does not require the data link 230 to be dedicated solely for redundancy purposes. Any remaining global memory not utilized for memory segments 212 and 222, for example, may be employed for other shared-memory reasons such as general inter- and intra-system communications.

Any other information necessary to support redundancy may be added to memory segment 212 (and/or memory segment 222). For optimum system performance, such other information—regardless of meaning or purpose—should be structured as described above for call states and resource allocation records and including within Record 1 through Record x.

Figure 3:
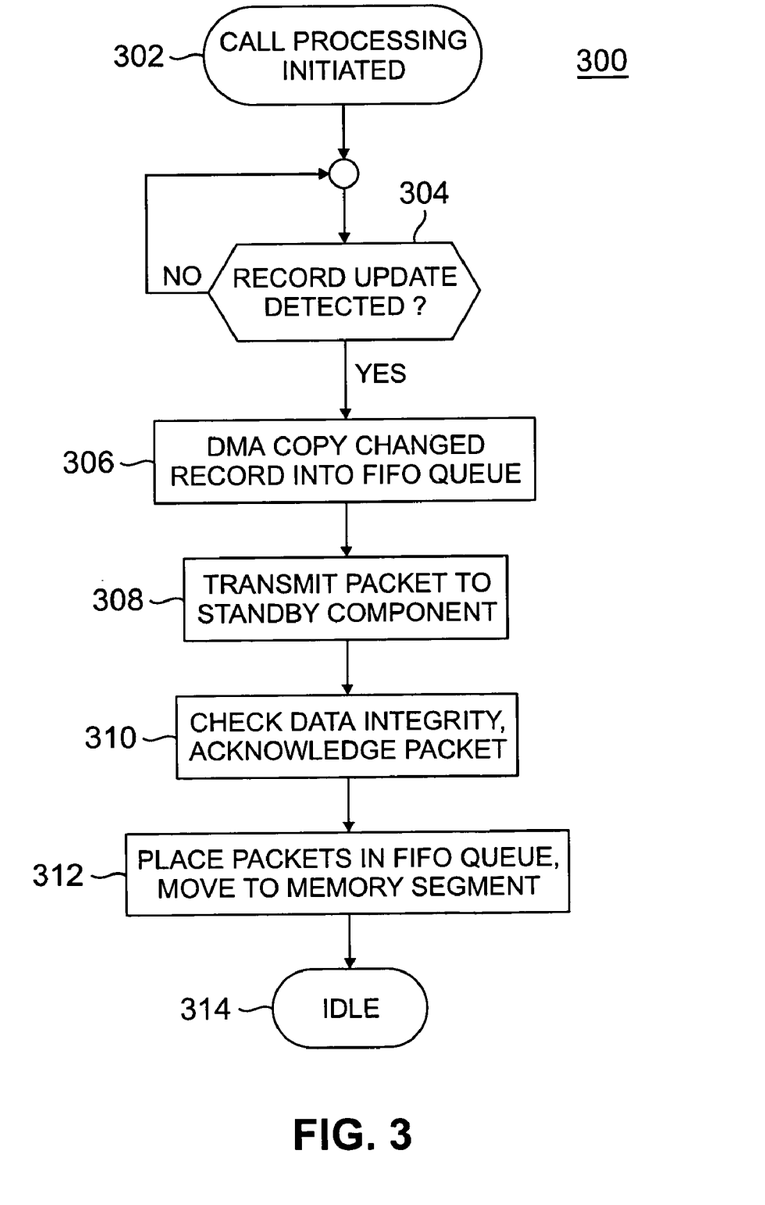
FIG. 3 is a high level flow diagram illustrating the operation of the exemplary memory equalization structure according to one embodiment of the present invention.

FIG. 3 depicts a high level flow diagram 300 which illustrates the operation of the exemplary memory equalization structure according to one embodiment of the present invention, and is intended to be read in conjunction with FIGS. 1 and 2. The process begins with call processing being initiated (step 302) within the fixed wireless access network 100 utilizing the redundant active and standby components 210 and 220 together with the Firewire-based data link 230 and implementing memory equalization. Control processor 211 is actively processing calls as required by the system configuration for fixed wireless access network 100. As calls are processed, records of the associated call state changes and resource allocations are stored as data structures Record 1 through Record x in contiguous memory locations within local memory segment 212 for active component 210.

Upon detection of a record being changed (step 304), the standby component 220 must be updated to reflect the change. The update is accomplished utilizing:

a first-in, first-out (FIFO) queue 213 within the active component 210 for storing and buffering memory records prior to transfer to the standby component 220 and a FIFO queue 223 within the standby component 220 for storing and buffering memory records received from the active component 210 prior to updating memory segment 222;

direct memory access (DMA) circuits 214 and 224 within active and standby components 210 and 220, respectively, with each DMA circuit 214 and 224 capable of automatically transferring changed records into or out of memory segments 212 and 222 and FIFO queues 213 and 223 as necessary; and Firewire data link controllers 215 and 225 within the active and standby components 210 and 220, respectively, where Firewire data link controller 215 formats and transfers data according to DMA descriptors stored in a locally accessible memory 216 within the active component 210, which is read by data link controller 215.

As each record within memory segment 212 is modified and the change is detected, the record is copied into FIFO queue 213 by the DMA circuit 214 (step 306). The mechanism may be employed to trigger the transfer by the DMA circuit 214 is critical and may be accomplished by one or more implementations, depending on the tradeoffs which are acceptable for a specific design.

Figure 4A:
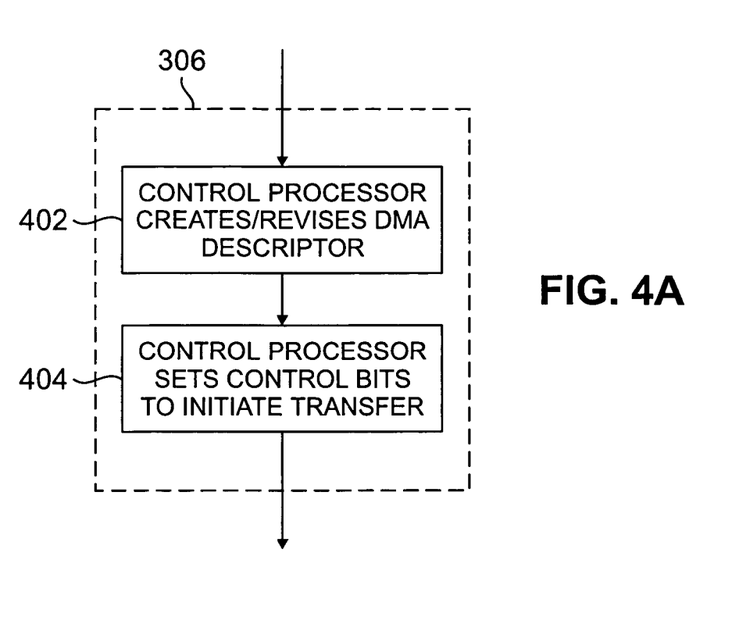
FIGS. 4A–4C are high level flow diagrams illustrating different processes for initiating a direct memory access transfer of changed records during memory equalization according to one embodiment of the present invention.
Figure 4B:
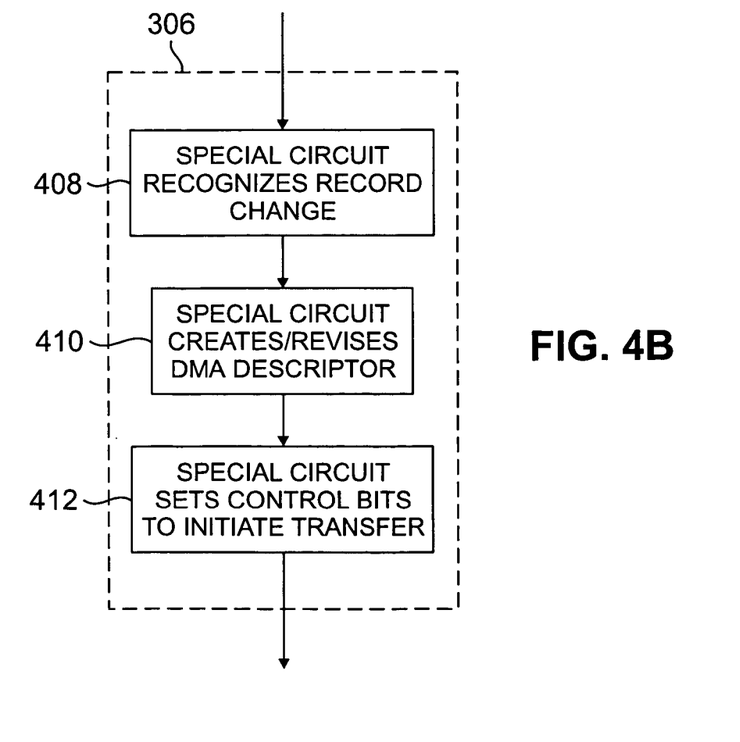
Figure 4C:
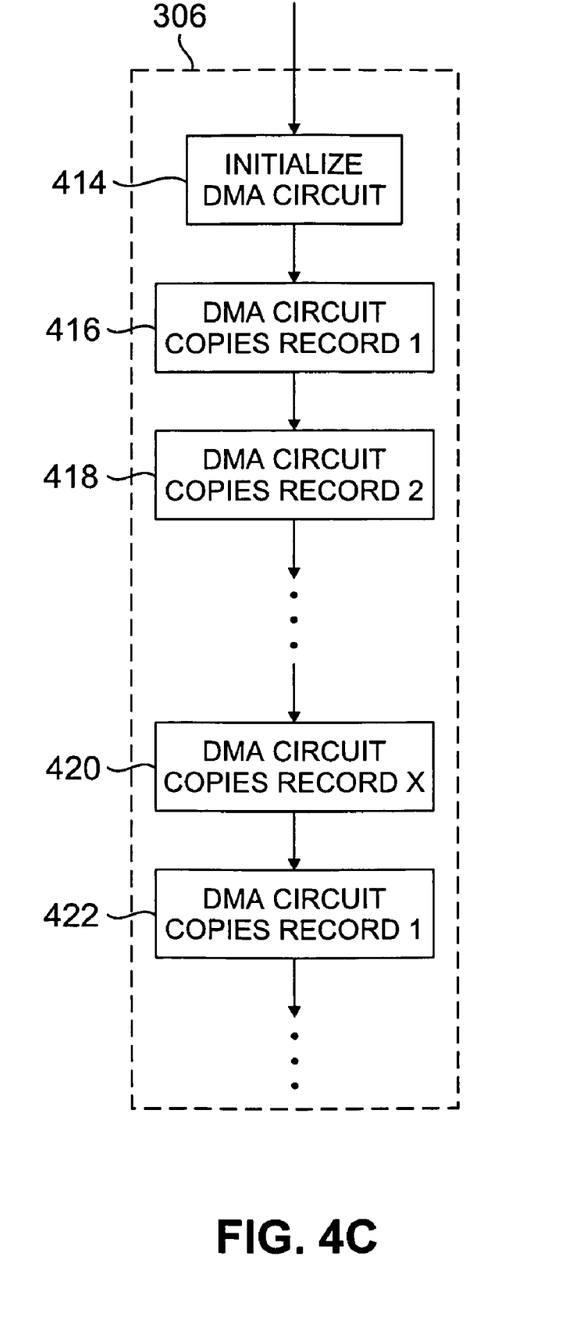

FIGS. 4A–4C are high level flow diagrams illustrating different processes for initiating a direct memory access transfer of changed records during memory equalization according to one embodiment of the present invention, and are intended to be read in conjunction with FIGS. 1 through 3. The process of FIG. 4A employs the control processor 211 within the active component 210 to initiate the DMA transfer of changed records. Control processor 211 creates or revises a DMA descriptor for each modified record when the respective record is modified (step 402). The DMA descriptor reflects the starting address, the ending address, and the length of the modified record. It should be noted that descriptors for all records Record 1 through Record x within memory segment 212 may be pre-defined during system initialization, such that only minimal changes are necessary during system runtime. The descriptors are simply "reused" each time a particular record needs to be transferred to the standby component 220. Once the descriptor for a changed record is correct, the control processor sets the appropriate control bits (step 404) to initiate transfer of the data by DMA circuit 214.

The process of FIG. 4B employs a special circuit (not shown in FIG. 2) within the active component 210 to automatically recognize (step 406) an update to a record within memory segment 212. Detection of updates may be accomplished utilizing circuitry which detects writes to selected, specific memory locations corresponding to records in memory segment 212. By convention, when memory writes for such locations occur, a complete record is deemed updated and the data is copied to the standby component to maintain equalization. The specialized hardware sets a DMA descriptor (step 410) according to the memory address which has been modified and initiates the appropriate DMA transfer (step 412).

In the process of FIG. 4C, the DMA circuit 214 within the active component 210 is initialized during system initialization (step 414), prior to the start of call processing. The DMA process is then allowed to run on a continual basis, sequencing through the records Record 1 through Record x within memory segment 212 in a continuous loop (steps 416, 418, 420 and 422), copying each record in turn (whether updated or not) to FIFO queue 213. Updated records will therefore be copied to FIFO queue 213 within one cycle of the DMA circuit 214 through memory segment 212. This technique alleviates the need for development of any significant amount of supporting software, and also minimizes hardware development since the detection of write operations to specific memory locations is no longer required. However, a performance tradeoff results from the fact that changed locations are transferred to the standby component 220 on a periodic basis rather than instantaneously as the changes are made.

Referring back to FIG. 3, once a changed record has been copied by the DMA circuit 214 to the FIFO queue 213 within data link controller 215, the packet is transmitted to the standby component 220 (step 308) according to the standard asynchronous protocol embodied in all Firewire transfers. It should be noted that the Firewire data link 230 (through controllers 215 and 225) contains all necessary checks of data integrity and positively acknowledges all successful packet transfers.

The Firewire Global Memory mapping described above allows the data link controller 215 to transfer the record to the appropriate physical entity (standby component 220) and into the appropriate location within memory segment 222 with direct control by the control processor 211. Moreover, once the control processor 211 updates a record and the DMA transfer to the FIFO queue 213 has begun, the control processor 211 may continue processing other calls.

The basic constraint on call processing relative to redundancy is to assure that the FIFO queue is being emptied at least as fast as the control processor 211 is processing calls (and therefore modifying records within memory segment 212). A FIFO queue full signal 217 may be needed to control the flow of data into the Firewire data link 230 by allowing the control processor 211 to suspend processing as necessary. When the control processor 211 suspends processing, the FIFO queue 213 is (at least partially) emptied, preserving all critical memory updates. However, this issue only arises when the processing load is large relative to the throughput available through the Firewire serial link. In a properly designed system, where the offered load is properly matched to the available throughput, a flow control mechanism such as FIFO queue full signal 217 is unnecessary, but may be used only as a fail-safe mechanism. Moreover, other than suspending processing to allow the FIFO queue 213 to empty and, in some embodiments, triggering copying of a memory segment to the FIFO queue 213, the control processor is not involved in transfer of data packets over the data link 230 to standby component 220.

Within the standby component 220, received packets are checked for integrity and acknowledged (step 310) as the packets are received within data link controller 225. Packets which clear the integrity check are placed in FIFO queue 213 and, according to the contents of each packet, the payload of each packet automatically transferred by DMA circuit 224 into the appropriate local memory segment 222 for standby component 220. At this point, the memory segment 222 within standby component 220 mirrors the memory segment 212 within the active component 210 (assuming no other record changes were initiated while the packet was being transmitted between FIFO queue 213 and memory segment 222). In standby mode, the control processor 221 for standby component 220 is able to offer additional data integrity checks on a background basis. Otherwise, no software functions need be performed by control processor 211 other than continually monitoring for a failure indication of the active component 210.

Figure 5:
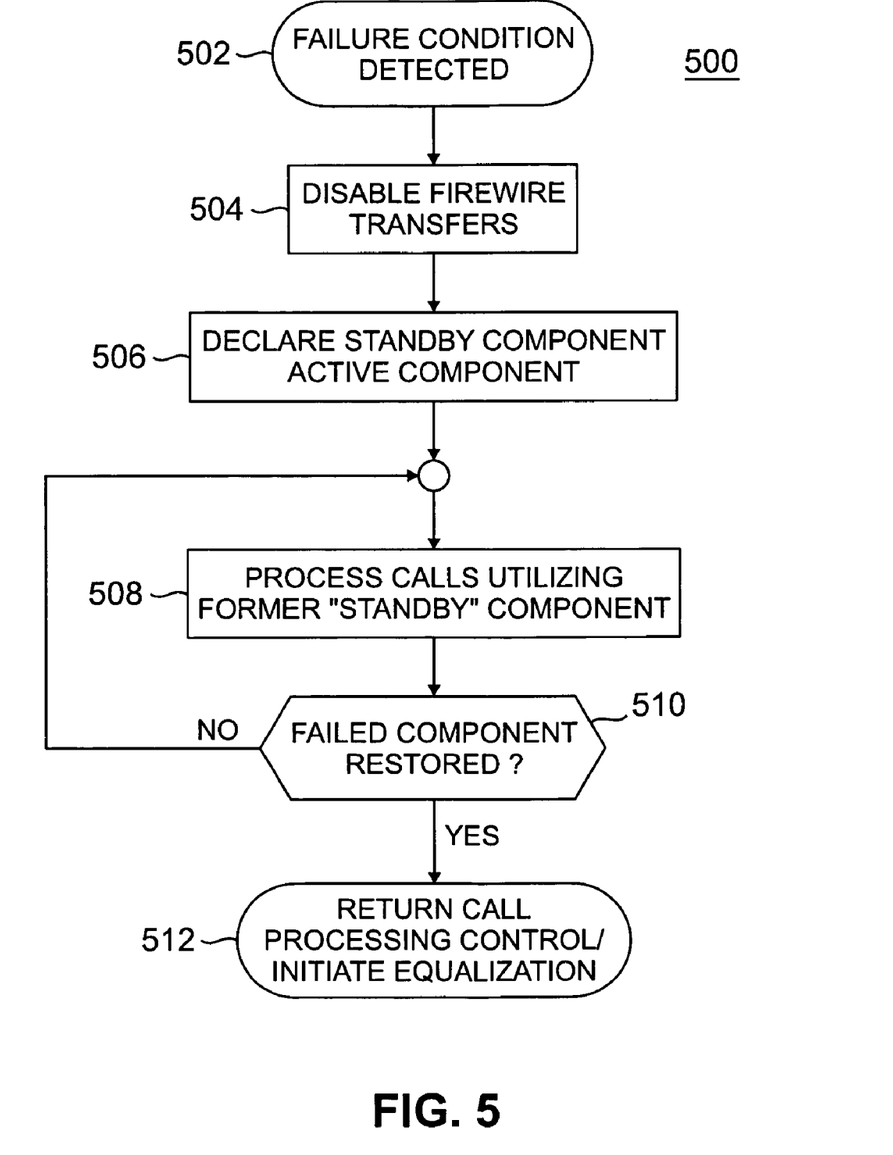
FIG. 5 is a high level flow diagram illustrating a process for switch-over of primary functionality between redundant components employing memory equalization according to one embodiment of the present invention.

FIG. 5 depicts a high level flow diagram 500 which illustrates a process for switch-over of primary functionality between redundant components employing memory equalization according to one embodiment of the present invention, and is intended to be read in conjunction with FIGS. 1 and 2. The process illustrated occurs within the standby component 220 and is triggered by detection of a failure condition within the active component 210. Immediately upon detection of a failure condition for the active component 210 (step 502), the standby component 220 disables all Firewire transfers from the (formerly) active component 210 (step 504) to prevent possible corruption of the equalized memory segment 222. The standby component 220 also declares itself the "active" component (step 506) and begins executing the same call processing which was previously being handled by the formerly active component 210 (step 508), working off the local memory segment 222. Due to the ongoing equalization process, the control processor 221 is immediately ready to begin call processing.

The new "active" (formerly "standby") component 220 continues processing calls until restoration or replacement of the failed component 210 is detected (step 510). Upon such detection, the new active component 220 has the option of either (a) transferring call processing control back to the original component 210, or alternatively (b) initiating memory equalization in the same manner as originally performed (step 512), and beginning to update the other component 210 which assumes the system standby role.

Figure 6:
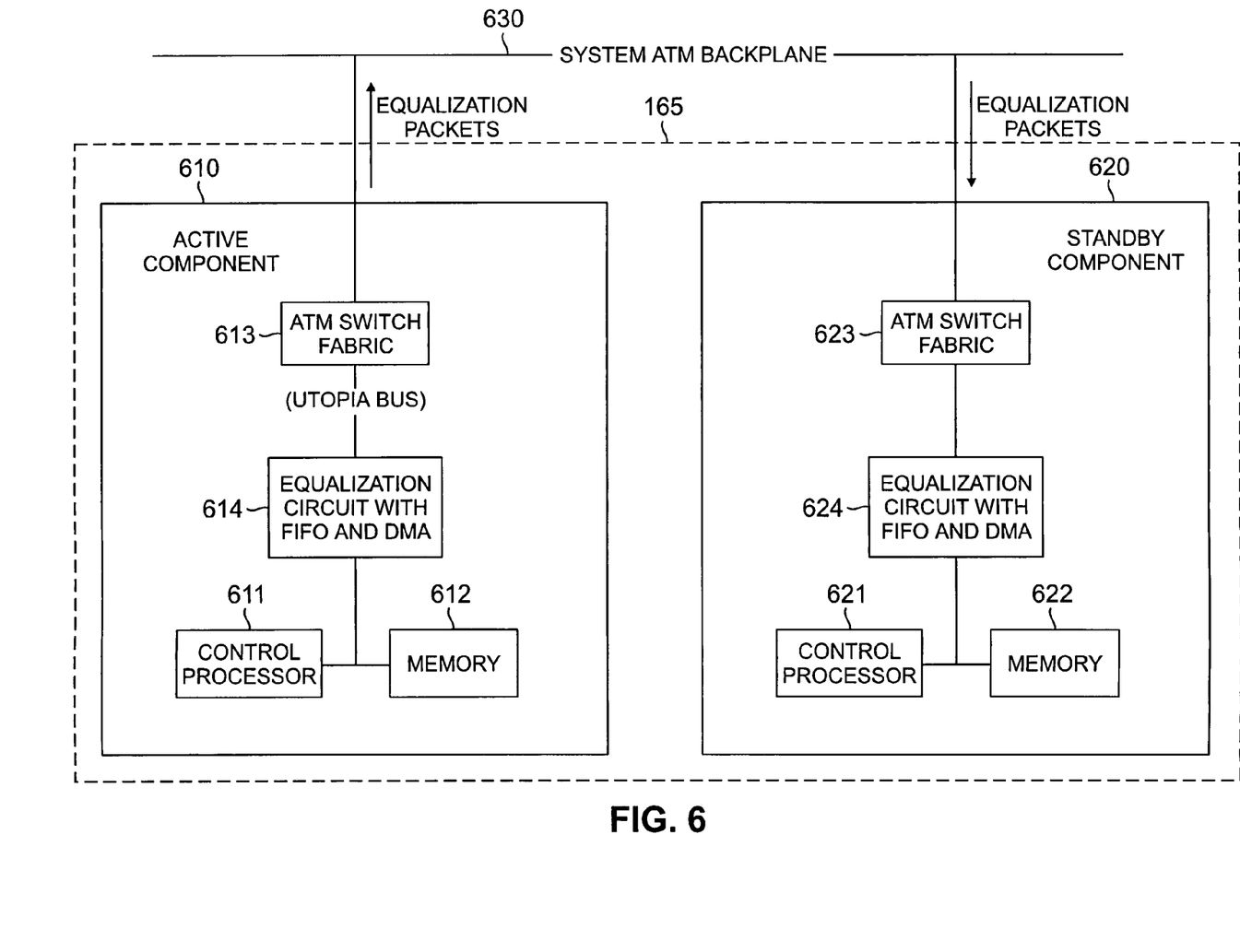
FIG. 6 illustrates redundant processing units utilizing memory equalization according to an alternative embodiment of the present invention.

FIG. 6 illustrates redundant processing units utilizing memory equalization according to an alternative embodiment of the present invention. In the alternative implementation shown, most of the basic assumptions for the Firewire implementation of FIGS. 2 through 5 remain the same. Active and standby components 610 and 620 include control processors 611 and 621 and local memory segments 612 and 622 containing call states, resource allocation records, and any other necessary information. Equalization circuits 614 and 624 with FIFO queues and DMA circuits are employed to read records into or out of memory segments 612 and 622 within active and standby components 610 and 620.

However, an Asynchronous Transfer Mode (ATM) transport on an system ATM backplane 630 is employed for transfer of records between active and standby components 610 and 620 rather than Firewire. The connection between equalization circuits 614 and 624 to the ATM switch fabric 613 and 623 within active and standby components 610 and 620 may be through a Utopia bus or any other hardware bus. Otherwise, the overall result is essentially the same. In general, ATM-based systems inherently include hardware-based checks for data integrity, with accompanying hardware-based acknowledgment of successful data transfers. The alternative implementation of FIG. 6 is thus consistent with the Firewire implementation of FIGS. 2 through 5 insofar as the successful transfer of data is inherent in the data link. Also, the order of the data which has been transferred from the active component 610 is reassembled within the standby component 620 by mechanisms common to ATM systems, eliminating the need for software intervention.

The ATM implementation of FIG. 6 enjoys several advantages over the Firewire implementation of FIGS. 2 through 5, including:

1. increased data transfer capacity, and therefore support for significantly higher call traffic and/or alternative system architecture; and 2. lower latency.

These benefits accrues from the parallel nature of the ATM backplane 630 as opposed to the serial link which Firewire embodies. Consequently, this alternative implementation may be attractive for very large capacity systems requiring more throughput of memory segments than can be accommodated via Firewire.

It should be noted that with significantly increased throughput relative to the aggregate traffic load, the possibility of supporting alternative redundancy architectures becomes viable. For example, the active and standby components 610 and 620 need not be co-located as is currently typical. The two components 610 and 620 could be spatially separated, with the only limitation on distance being that the added transport latency not be prohibitive, a system-specific issue requiring system analysis. Otherwise, the benefit might be to construct clusters of redundant components which need not be paired physically as is generally required in current systems, an option enabled by the capability of this alternative implementation to minimize equalization latency.

Figure 7:
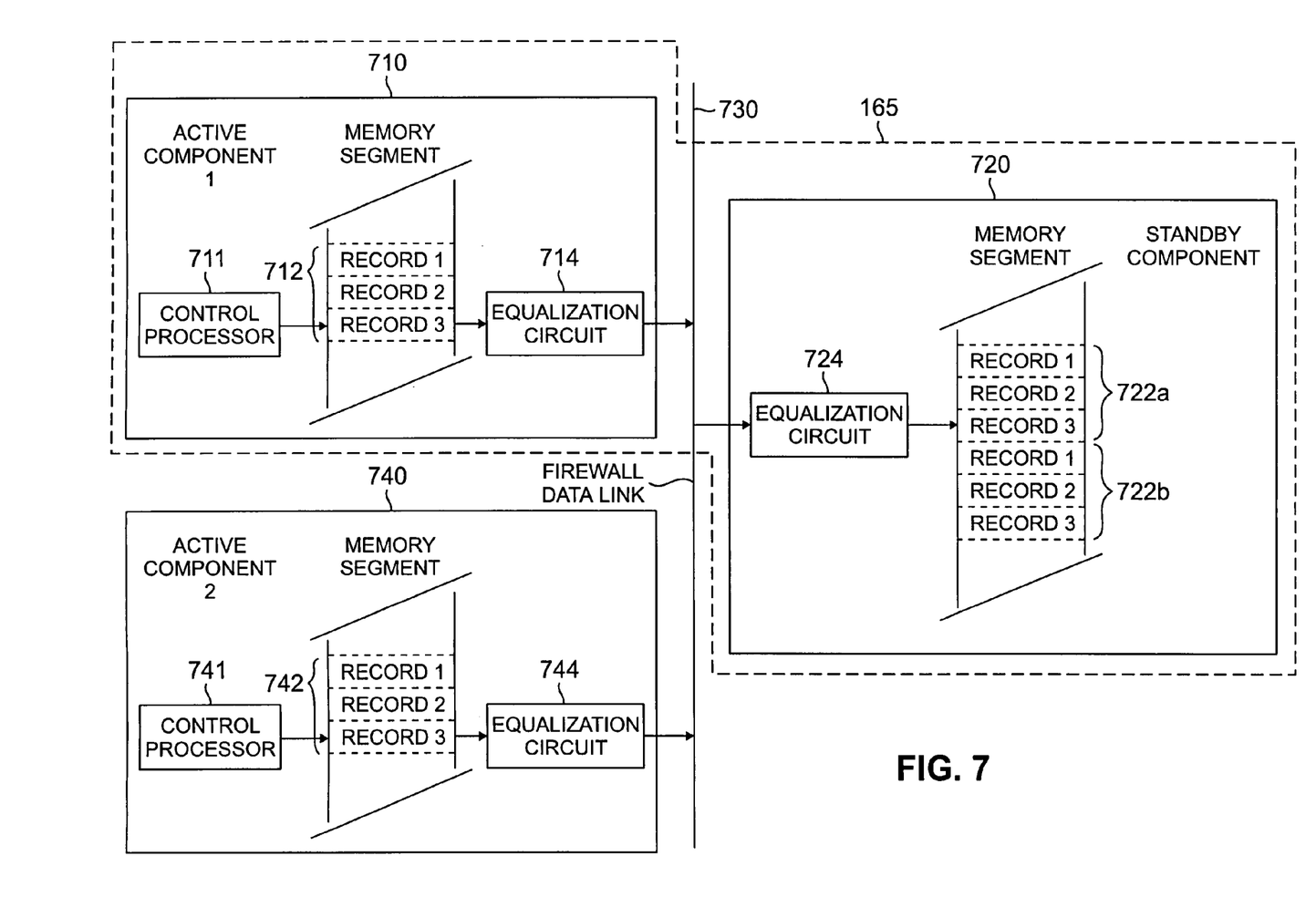
FIG. 7 depicts 1:N redundancy processing units utilizing memory equalization according to yet another embodiment of the present invention.

FIG. 7 depicts 1:N redundancy processing units utilizing memory equalization according to yet another embodiment of the present invention. Again, most of the basic assumptions for the Firewire implementation of FIGS. 2 through 5 remain the same for this implementation. Active and standby components 710 and 720 include control processors 711 and 721 and local memory segments 712 and 722a containing call states, resource allocation records, and any other necessary information. Equalization circuits 714 and 724 are employed to read records into or out of memory segments 712 and 722a and transfer such records over Firewire data link 730.

In this embodiment, however, a different redundancy topology is employed—a "1 of N" or "1:N" redundancy topology where one component 720 serves as a standby component for N active components 710, 740 (where N is any positive, non-zero integer). In the 1:N topology shown in FIG. 7, each active component 710, 740 supported by standby component 720 includes a control processor 711, 741, an equalization circuit 714, 744, and a memory segment 712, 742 for call states, resource allocation records, and other information for call processing by the respective active component. This 1:N topology requires standby component 720 to maintain equalized memory for memory segments 712, 742 within all N active components 710, 740 supported by standby component 720. By properly managing the Firewire Global memory mapping, such a topology could employ memory equalization in accordance with the present invention, with standby component 720 including memory segment 722a which is equalized with memory segment 712 within active component 710 and memory segment 722b which is equalized with memory segment 742 within active component 740. Although only two active components are depicted in the exemplary embodiment shown, the topology may be readily extending to a larger number of active components. The basic limitation is to assure adequate throughput on the data link relative to the combined requirements of multiple active components.

The present invention provides a high-performance memory equalization technique with accompanying software support for redundant, high-availability telecommunications systems, where the memory equalization technique applies to redundant, processor-based components within such systems. While the memory equalization technique has been shown and described in the context of telecommunications infrastructure equipment, the concepts are equally applicable for any processor-based system which, for redundancy purposes, must keep critical information equalized between active and standby components.

The present invention provides improved performance where redundancy is required insofar as a system, once a failure is detected, is capable of switching to a standby-side resource faster and (depending upon the failure mode) with no loss of mission critical data. Use of the present invention may alleviate significant amounts of software development which would otherwise be necessary to achieve the same goals. The present invention may be generalized to work across any high-performance data link, which affords the ability to create telecommunications systems where the redundant systems need not be co-located (e.g., within the same shelf) while still meeting demanding system performance requirements. A variety of distributed telecommunications architectures which are fully redundant are therefore viable.

Despite having tightly coupled active and standby components with respect to mission critical data, the present invention is not susceptible to software failure as are other (e.g., hardware-based) solutions. Each data packet may be checksummed and verified prior to being written into the standby side's memory and, as an additional check, the standby side may perform audits of the equalization memory segments to further guard against software failures. In addition to support for improved performance within redundant systems, the present invention achieves such performance at an extremely low cost relative to the overall system cost.

Although the present invention has been described in detail, those skilled in the art should understand that they can make various changes, substitutions and alterations herein without departing from the spirit and scope of the invention in its broadest form.

What is claimed is:

1. For use in a redundant, high-availability system of processor-based components, a system for memory equalization comprising:

a memory containing data elements each stored within one of a plurality of defined memory segments, wherein the data elements within the memory segments may be selectively changed;

a direct memory access circuit automatically copying memory segments from the memory to a queue without utilizing a processor changing the memory segments;

a data link coupled to the queue, wherein each of the plurality of memory segments is structured to form a data packet which may be transmitted without internal changes over the data link; and a control preventing the memory segments from receiving changes to the data elements contained therein faster than transfer of data elements within the memory segments over the data link.

2. The system as set forth in claim 1, further comprising:
a processor intermittently changing data elements within the memory segments, wherein the data link operates without direct control by the processor.

3. The system as set forth in claim 1, wherein the memory further comprises a set of memory segments mapping to a corresponding set of memory segments within a device coupled to the data link.

4. The system as set forth in claim 1, wherein the memory further comprises a portion of Firewire Global Memory and wherein the data link comprises a Firewire data link.

5. The system as set forth in claim 1, wherein each of the data elements further comprise one of the following:
call state information for a call being processed;
resource allocation records for resources allocated to a call being processed; and
other information regarding a call being processed.

6. The system as set forth in claim 1, wherein the direct memory access circuit copies memory segments containing changed data elements therein from the memory to the queue, the copying of a memory segment being triggered by a processor which intermittently changes data elements within the memory segments.

7. The system as set forth in claim 6, wherein the processor writes a direct memory access descriptor for a memory segment containing a changed data element and sets controls bits initiating copying of the memory segment by the direct memory access circuit.

8. The system as set forth in claim 1, wherein the direct memory access circuit copies memory segments containing changed data elements therein from the memory to the queue, the copying of a memory segment being triggered by a circuit monitoring writes to preselected memory addresses to detect changes to a data element within any memory segment.

9. The system as set forth in claim 1, wherein the direct memory access circuit sequentially copies each of the memory segments from the memory to the queue in a continuous loop.

10. The system as set forth in claim 1, wherein the data link operates in accordance with an asynchronous transfer mode.

11. A redundant, high-availability system of processor-based components, comprising:
an active component;
a standby component; and
a system for memory equalization between the active and standby components comprising:
counterpart memories within the active and standby components each containing data elements stored within one of a plurality of defined memory segments mapped to addresses within both of the counterpart memories, wherein the data elements within the memory segments may be selectively changed;
a direct memory access circuit within each of the active and standby components, the direct memory access circuit within the active component capable of automatically copying memory segments from the memory within the active component to a queue within the active component without utilizing a processor within the active component changing the memory segments within the active component and the direct memory access circuit within the standby component capable of automatically copying memory segments from a queue within the standby component to the memory within the standby component without utilizing a processor within the standby component changing the memory segments within the standby component;
a data link coupling to the queue within the active component to the queue within the standby component, wherein each of the plurality of memory segments is structured to form a data packet which may be transmitted without internal changes over the data link; and
a control within the active component preventing the memory segments within the memory in the active component from receiving changes to the data elements contained therein faster than transfer of data elements within the memory segments over the data link.

12. The system as set forth in claim 11, wherein the active component further comprises:
a processor intermittently changing data elements within the memory segments, wherein the data link operates without direct control by the processor.

13. The system as set forth in claim 11, wherein the counterpart memories within the active and standby components each further comprise a set of memory segments mapping to a common set of addresses.

14. The system as set forth in claim 11, wherein the counterpart memories within the active and standby components further comprise a portion of Firewire Global Memory and wherein the data link comprises a Firewire data link.

15. The system as set forth in claim 11, wherein each of the data elements within either of the counterpart memories further comprise one of the following:
call state information for a call being processed;
resource allocation records for resources allocated to a call being processed; and
other information regarding a call being processed.

16. The system as set forth in claim 11, wherein the direct memory access circuit within the active component copies memory segments containing changed data elements therein from the memory within the active component to the queue within the active component, the copying of a memory segment being triggered by a processor within the active component which intermittently changes data elements within the memory segments within the active component.

17. The system as set forth in claim 16, wherein the processor within the active component writes a direct memory access descriptor for a memory segment within the active component which contains a changed data element and sets controls bits initiating copying of the memory segment within the active component by the direct memory access circuit within the active component.

18. The system as set forth in claim 11, wherein the direct memory access circuit within the active component copies memory segments containing changed data elements therein from the memory within the active component to the queue within the active component, the copying of a memory segment being triggered by a circuit within the active component which monitor writes to preselected memory addresses to detect changes to a data element within any memory segment within the active component.

19. The system as set forth in claim 11, wherein the direct memory access circuit within the active component sequentially copies each of the memory segments from the memory within the active component to the queue within the active component in a continuous loop.

20. The system as set forth in claim 11, wherein a controller for the data link within the standby component verifies data integrity for data packets received over the data link and acknowledges successful transfer of data packets over the data link to the active component.

21. The system as set forth in claim 11, wherein the direct memory access circuit within the standby component automatically moves memory segments from a queue within the standby component coupled to the data link into a corresponding memory location in the memory within the standby component.

22. The system as set forth in claim 11, wherein the data link operates in accordance with an asynchronous transfer mode.

23. The system as set forth in claim 11, wherein the active component is one of N active components supported by the standby component.

24. For use in a redundant, high-availability system of processor-based components, a method of memory equalization comprising the steps of:
- selectively changing data elements each stored within one of a plurality of defined memory segments contained within a memory;
- automatically copying memory segments from the memory to a queue utilizing a direct memory access circuit and without utilizing a processor changing the memory segments;
- transferring memory segments over a data link coupled to the queue, wherein each of the plurality of memory segments is structured to form a data packet which may be transmitted without internal changes over the data link; and
- inhibiting the memory segments from receiving changes to the data elements contained therein faster than transfer of data elements within the memory segments over the data link.

25. The method as set forth in claim 24, further comprising:
- intermittently changing data elements within the memory segments utilizing a processor, wherein the data link operates without direct control by the processor.

26. The method as set forth in claim 24, further comprising:
- mapping the memory segments to a common set of addresses for counterpart memory segments within a standby component.

27. The method as set forth in claim 26, wherein the steps of mapping the memory segments to a common set of addresses for counterpart memory segments within a standby component and transferring memory segments over a data link coupled to the queue further comprise:
- mapping a portion of Firewire Global Memory to the memory segments and the counterpart memory segments; and
- transferring memory segments over a Firewire data link.

28. The method as set forth in claim 24, further comprising:
- storing one of the following within each of the data elements:
  - call state information for a call being processed;
  - resource allocation records for resources allocated to a call being processed; and
  - other information regarding a call being processed.

29. The method as set forth in claim 24, wherein the step of automatically copying memory segments from the memory to a queue utilizing a direct memory access circuit further comprises:
- initiating copying of a memory segment by a processor within an active component containing the memory segment, wherein the processor intermittently changes data elements within the memory segments within the active component.

30. The method as set forth in claim 29, further comprising:
- writing a direct memory access descriptor for a memory segment within the active component which contains a changed data element; and
- setting controls bits initiating copying of the memory segment which contains the changed data element by the direct memory access circuit.

31. The method as set forth in claim 24, wherein the step of automatically copying memory segments from the memory to a queue utilizing a direct memory access circuit further comprises:
- initiating copying of a memory segment by a circuit within an active component containing the memory segment, wherein the circuit monitor writes to preselected memory addresses to detect changes to a data element within any memory segment within the active component.

32. The method as set forth in claim 24, wherein the step of automatically copying memory segments from the memory to a queue utilizing a direct memory access circuit further comprises:
- utilizing the direct memory access circuit, sequentially copying each memory segment from the memory to the queue in a continuous loop.

33. The method as set forth in claim 24, wherein the step of transferring memory segments over a data link coupled to the queue further comprises:
- transmitting the memory segments to a standby component coupled to the data link, wherein a controller for the data link within the standby component verifies data integrity for data packets received over the data link and acknowledges successful transfer of data packets over the data link to an active component containing the queue.

34. The method as set forth in claim 33, wherein the step of transmitting the memory segments to a standby component coupled to the data link further comprises:
- receiving the memory segments in a queue within the standby component, wherein a direct memory access circuit within the standby component automatically moves memory segments from the queue within the standby component into a corresponding memory location in a memory within the standby component.

35. The method as set forth in claim 24, wherein the step of transferring memory segments over a data link coupled to the queue further comprises:
- transmitting the memory segments utilizing an asynchronous transfer mode switch.

36. The method as set forth in claim 24, further comprising:
- supporting processing within an active component containing the memory and the queue utilizing a standby component coupled to the data link, wherein the active component is one of N active components supported by the standby component.

* * * * *